US011939889B2

(12) United States Patent
Heinze et al.

(10) Patent No.: US 11,939,889 B2
(45) Date of Patent: Mar. 26, 2024

(54) METHOD FOR MANUFACTURING AN ENGINE COMPONENT WITH A COOLING DUCT ARRANGEMENT AND ENGINE COMPONENT

(71) Applicant: Rolls-Royce Deutschland Ltd & Co KG, Blankenfelde-Mahlow (DE)

(72) Inventors: Kay Heinze, Ludwigsfelde (DE); Michael Ebel, Rangsdorf (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 253 days.

(21) Appl. No.: 17/435,953

(22) PCT Filed: Mar. 3, 2020

(86) PCT No.: PCT/EP2020/055587
§ 371 (c)(1),
(2) Date: Sep. 2, 2021

(87) PCT Pub. No.: WO2020/178295
PCT Pub. Date: Sep. 10, 2020

(65) Prior Publication Data

US 2022/0162955 A1 May 26, 2022

(30) Foreign Application Priority Data

Mar. 4, 2019 (DE) .................... 10 2019 105 442.7

(51) Int. Cl.
*F01D 9/06* (2006.01)
*F01D 5/18* (2006.01)
(Continued)

(52) U.S. Cl.
CPC ............. *F01D 9/065* (2013.01); *F01D 5/186* (2013.01); *F01D 9/023* (2013.01); *F23R 3/06* (2013.01);
(Continued)

(58) Field of Classification Search
CPC .......... F01D 5/186; F01D 5/187; F01D 9/023; F01D 9/065; F01D 25/08; F01D 25/12;
(Continued)

(56) References Cited

U.S. PATENT DOCUMENTS 5,241,827 A * 9/1993 Lampes .................. F01D 5/186 60/757
6,205,789 B1 * 3/2001 Patterson .................. F23R 3/06 60/754
(Continued)

FOREIGN PATENT DOCUMENTS

DE 69223441 T2 7/1998
DE 60012289 7/2005
(Continued)

OTHER PUBLICATIONS

International Search Report and Written Opinion dated May 29, 2020 from counterpart International Patent Application No. PCT/EP2020/055587.
(Continued)

*Primary Examiner* — Brian P Wolcott
(74) *Attorney, Agent, or Firm* — SHUTTLEWORTH & INGERSOLL, PLC; Timothy J. Klima

(57) ABSTRACT

The present invention relates to a method for producing an engine component having a cooling duct arrangement which has a plurality of cooling ducts, each having an inflow opening, the inflow openings being arranged according to a predefined pattern in an inflow surface of the engine component, and each cooling duct opening into a recess in a wall of the engine component, along which wall a cooling film is to be formed. According to the invention, the pattern is formed in at least one subregion of defined size of the inflow surface, from a plurality of identical isosceles triangles, which are defined by a minimum spacing (k) and by a mean diameter (a) of the inflow openings correlating to the minimum spacing (k). This procedure reduces the complexity of the design process.

14 Claims, 9 Drawing Sheets

(51) Int. Cl.
*F01D 9/02* (2006.01)
*F23R 3/06* (2006.01)

(52) U.S. Cl.
CPC ...... *F05D 2240/11* (2013.01); *F05D 2240/15* (2013.01); *F05D 2240/35* (2013.01); *F05D 2240/81* (2013.01); *F05D 2250/11* (2013.01); *F05D 2260/202* (2013.01); *F23R 2900/03041* (2013.01); *F23R 2900/03042* (2013.01)

(58) Field of Classification Search
CPC .. F23R 3/06; F23R 2900/03041–03042; F05D 2240/35
See application file for complete search history.

(56) References Cited

U.S. PATENT DOCUMENTS

| | | | | |
|---|---|---|---|---|
| 6,546,731 | B2 * | 4/2003 | Alkabie | F23R 3/04<br>60/757 |
| 6,964,170 | B2 * | 11/2005 | Alkabie | F23M 20/005<br>60/725 |
| 7,669,422 | B2 * | 3/2010 | Suleiman | F23R 3/06<br>60/754 |
| 7,748,222 | B2 * | 7/2010 | Bernier | F23R 3/06<br>60/754 |
| 8,794,961 | B2 * | 8/2014 | Chandler | F23R 3/002<br>431/352 |
| 2014/0290258 | A1 * | 10/2014 | Gerendas | F23R 3/002<br>60/754 |
| 2018/0142563 | A1 * | 5/2018 | Commaret | F02C 7/04 |
| 2018/0216826 | A1 | 8/2018 | Spence et al. | |

FOREIGN PATENT DOCUMENTS

| | | | |
|---|---|---|---|
| DE | 69934653 | T2 | 10/2007 |
| DE | 102012025375 | A1 | 7/2014 |
| EP | 1629234 | A1 | 3/2006 |
| EP | 2508803 | A2 | 10/2012 |
| EP | 3006671 | A2 | 4/2016 |
| EP | 3101231 | A1 | 12/2016 |
| WO | 2013143627 | A1 | 10/2013 |

OTHER PUBLICATIONS

German Search Report dated Nov. 15, 2019 from counterpart German Patent Application No. 102019105442.7.

* cited by examiner

METHOD FOR MANUFACTURING AN ENGINE COMPONENT WITH A COOLING DUCT ARRANGEMENT AND ENGINE COMPONENT

This application is the National Phase of International Application PCT/EP2020/055587 filed Mar. 3, 2020 which designated the U.S.

This application claims priority to German Patent Application No. 102019105442.7 filed Mar. 4, 2019, which application is incorporated by reference herein.

The proposed solution relates to a method for producing an engine component having a cooling duct arrangement, and to an engine component.

EP 3 101 231 A1 has already disclosed an engine component, e.g. in the form of a combustion chamber shingle, in which a cooling duct arrangement for cooling a wall of the engine component by means of a cooling film is provided. Here, the cooling duct arrangement comprises a plurality of cooling ducts, each having an inflow opening, which open into associated recesses in the wall to be cooled. In this case, a recess proposed in EP 3 101 231 A1 is of pocket-like design and has an additional impact wall, e.g. in the form of a segment of an ellipsoid of revolution or of a spoon back in order to assist the formation of a homogeneous cooling film on the surface of the wall.

It has been found that it can also be critical for the formation of a cooling film which is as homogeneous as possible by cooling fluid passed via the cooling duct arrangement how the inflow openings for the individual cooling ducts are arranged in the inflow surface and, in particular, what is the relationship between a mean diameter of a respective inflow opening and a maximum width of the recess formed in the wall (measured transversely to the flow direction). In this context, the process of determining and making an appropriate cooling duct arrangement and a matching pattern for the arrangement of the inflow openings in accordance with a specified mass flow of cooling fluid (depending on the material temperature that is not to be exceeded during the operation of the engine) is often associated in practice with a not inconsiderable effort.

Consequently, there is a need for improvement in this respect of the production of an engine component having a cooling duct arrangement, and for an engine component which is simple to produce.

This object is achieved both by a method and by an engine component as disclosed herein.

Here, the proposed method envisages determining a pattern for the arrangement of the inflow opening in the cooling duct arrangement, comprising the following steps:

- specifying a minimum spacing between two adjacent inflow openings,
- determining a number n of cooling ducts and a mean diameter for the inflow openings on the basis of a specified mass flow for the cooling fluid through the cooling ducts and on the basis of a length of extent of the inflow surface along a first direction of extent of the inflow surface,
- defining an isosceles triangle, at the vertices of which in each case a central point of one of three inflow openings with the mean diameter is provided, wherein, in the case of the isosceles triangle, the length of a base of the isosceles triangle, which base extends along the first direction of extent, corresponds to the specified minimum spacing,

- determining a maximum width of a recess, each recess being assigned to a cooling duct, on the basis of the mean diameter, and
- building up the pattern in at least one subregion of specified dimensions of the inflow surface using a multiplicity of identical isosceles triangles,
  - of which a row of triangles situated one behind the other along the first direction of extent defines n vertices (in accordance with the number of cooling ducts),
  - of which two adjacent triangles in each case have at least one vertex in common and
  - at the vertices of which a respective inflow opening with the mean diameter is provided, which in each case leads to a cooling duct that opens into an associated recess with the maximum width.

The basic concept of the proposed solution is thus to use defined geometrical relationships and a small number of critical input parameters (in the form of the minimum spacing, the specified mass flow and the length of extent of the inflow surface) to quickly and reproducibly specify a pattern for the inflow openings which is suitable for the desired cooling mass flow, by means of which openings a homogeneous cooling film providing adequate cooling on the wall can be produced with the aid of the cooling ducts and recesses, which each adjoin one another in the flow direction of the cooling fluid.

By specifying the proposed geometrical relationships and a relatively small set of critical input parameters, which are interdependent, it is possible to automate the generation of the pattern in a relatively simple manner and to adapt it without problems for different regions of an engine component that have different cooling requirements. Since it is envisaged that the pattern is built up in at least one subregion of specified dimensions of the inflow surface using a multiplicity of identical isosceles triangles, which are specified by a minimum spacing (which in this context refers to the spacing between the central points of two adjacent inflow openings) and a mean diameter of the inflow openings which correlates with the minimum spacing, all that is ultimately necessary is to specify a small number of parameters, e.g. strength-related and/or production-related parameters dependent on a desired target temperature of a material, in order to arrive at a pattern for the arrangement of the inflow openings in an inflow surface by means of which a desired cooling fluid mass flow for the cooling film to be produced can be achieved.

Thus, the minimum spacing that is to be specified can, for example, be specified by the strength properties of the material used to produce the engine component (e.g. an Ni- or Co-based alloy such as C263, H286 or H230). From this, it is then also possible to obtain the mean diameter of an inflow opening in order, given the envisaged minimum spacing and in view of the desired (area-based) cooling mass flow with a number n of inflow openings to be provided at equal distances from one another along the first direction of extent—using the inflow openings brought close together, at the maximum as far as the minimum spacing—to be able to supply a sufficient quantity of cooling fluid to the downstream cooling ducts.

As part of a variant embodiment of the proposed method, a height of the isosceles triangle and hence a spacing between a tip of the isosceles triangle and the base can be dependent on the specified minimum spacing, it being possible, in particular, for the following to apply for a height h as a function of a minimum spacing k $0.1\ k \le h \le 4\ k$. In particular, this includes the situation where a height of the isosceles triangle and hence a spacing between a tip of the isosceles triangle and the base can correspond to the specified minimum spacing. Accordingly, inflow openings of a (first) row extending along the first direction of extent are then, for example, spaced apart by the minimum spacing from a further (second) row of inflow openings, which is situated along the second direction of extent. Specifying the pattern by means of isosceles triangles means that an inflow opening of the further (second) row is then offset with respect to an inflow opening of the other (first) row by precisely half the minimum spacing. If, for example, the first direction of extent corresponds to a circumferential direction of the inflow surface and if the second direction of extent, perpendicular thereto, corresponds to an axial direction (which is then parallel to a central axis, for example, in the assembled state of the engine component within the engine), an axial spacing between individual rows of inflow openings would then be identical, for example, to the mutual spacings between the inflow openings of one row and, consequently, the inflow openings of two adjacent rows would be offset from one another by half the minimum spacing.

Although this is not compulsory for the proposed structure of the pattern for the inflow openings of the cooling duct arrangement from a plurality of isosceles (virtual) triangles, provision can be made in one variant embodiment for the bases of the triangles to extend parallel to one another. A regular arrangement of mutually parallel rows of inflow openings in the inflow surface is thereby achieved. In particular, this can be advantageous with a view to manufacture and to the homogenization of the cooling film to be produced.

One variant embodiment envisages that the pattern for the at least one subregion of the inflow surface on the basis of the triangles having common vertices extends along the first direction of extent and along a second direction of extent extending perpendicularly thereto. By means of the pattern built up with the isosceles triangles, an extended-area arrangement of the inflow openings is thus provided.

In principle, the minimum spacing and the mean diameter can be specified as proportional to one another. The minimum spacing and the mean diameter of the inflow openings for a subregion of the inflow surface are thus in a specified relationship to one another. Accordingly, the specification of one of the two input parameters in the form of the minimum spacing and the mean diameter is then sufficient, for example, to enable the other input parameters to be determined in accordance with the mass flow of cooling fluid to be achieved. For example, a range of values for permissible proportionality factors is specified for a relationship between the minimum spacing and a mean diameter.

On the basis of the proposed method, it is also possible to envisage adapting the pattern to different mass flows of cooling fluid while maintaining the structure composed of isosceles triangles. For variation of the mass flows of cooling fluid required/to be provided for different regions of the wall to be cooled, it is possible, in different subregions of the inflow surface, to provide mutually different subpatterns or pattern segments respectively adapted thereto. In this context, it is envisaged, for example, that, in at least one other specified subregion of the inflow surface, the pattern for the inflow openings is continued on the basis of the triangles having common vertices, but in this case the mean diameter for the inflow openings of the other subregion is then changed. The proposed development thus envisages that, continuing the fundamental structure using defined isosceles triangles, a mean diameter of the inflow openings is adapted for another subregion of the inflow surface (which corresponds to a region of the wall to be cooled in which, for example, there is a greater or lesser requirement for cooling fluid).

Alternatively or as a supplementary measure, the pattern for the inflow openings is continued in another subregion on the basis of the triangles having common vertices, but in this case the minimum spacing is changed. This includes the possibility, for example, that the minimum spacing is increased in order to take account of a different geometry or material properties of the engine component in the other subregion. Thus, for the other subregion, the pattern is then formed with a modified distribution of the inflow openings, for example, while maintaining the fundamental structure. As a result, the pattern configuration follows clearly specified rules and hence it is also relatively easy to carry it out in an automated manner.

In one variant embodiment, for example, the number of inflow openings for the at least one other subregion of the inflow surface is reduced along the second direction of extent by increasing the minimum spacing or just the height of the isosceles triangles. In this context, it may be expedient, for building up the pattern in the inflow surface in one variant of the method, to provide an arrangement of the inflow openings in a first subregion of the inflow surface in such a way that the inflow openings situated adjacent to one another along the first direction of extent are spaced apart from one another by precisely the minimum spacing and, in further subregions of the inflow surface, in which inflow openings are likewise to be provided, the minimum spacing is retained or at most increased, irrespective of whether a mean diameter of the inflow openings is possibly likewise changed, and is thus increased or reduced. This considerably reduces the design effort since, ultimately, the further inflow openings can be specified solely on the basis of one (first) subregion of the inflow surface, while maintaining the same basic model.

In one variant embodiment, it has proven advantageous, especially in connection with the provision of a cooling duct arrangement in a combustion chamber shingle for a combustion chamber of an engine, if the mean diameter for the inflow openings is in the range of from 0.2 mm to 2 mm.

As already explained, the minimum spacing may be fundamentally dependent on the mean diameter. In one variant embodiment, it is envisaged, for example, that the following applies for a minimum spacing k in the case of a mean diameter a:

$$2 \leq k \leq 8a$$

Alternatively or as a supplementary measure, possible proportionality factors can be specified for the minimum spacing in relationship to the mean diameter. For example, the following then applies for the minimum spacing k in the case of a mean diameter a:

$$k = i * a, \text{ where } i = \{2,3,4,5,6,7,8\}.$$

Alternatively or as a supplementary measure, it is possible, for a maximum width of the recess adjoining a cooling duct, to provide a direct dependence on the mean diameter to the extent that, in the case of a mean diameter a, the following applies for a maximum width s $$a \leq s \leq 8a.$$

In one variant embodiment, as an alternative or supplementary measure, the width is also proportional to the mean diameter. For example, the following applies for a maximum width s of the recess in the case of a mean diameter a in one variant embodiment:

$$s = j * a, \text{ where } j = \{1,2,3,4,5,6,7,8\}.$$

As already explained above, the pattern can be determined in a computer-assisted manner. In this case, for example, the minimum spacing for the definition of the (first) triangle can then be a first input parameter, the mass flow for the cooling fluid can be a second input parameter, and the length of extent of the inflow surface can be a third input parameter for a calculation algorithm which is carried out by at least one processor and which builds up the pattern for the inflow openings in the inflow surface on the basis of the first, second and third input parameters and the isosceles triangles defined thereby.

Here, the pattern, calculated by means of the calculation algorithm, for the arrangement of the inflow openings can then be made available, for example, to a manufacturing system for the production of the engine component. For example, a corresponding data set that represents the pattern to be produced can be made available in electronic form to the manufacturing system. On the basis of the pattern built up by means of the calculation algorithm, the manufacturing system can then, for example, additively produce the engine component with the inflow opening and the respectively associated cooling ducts and recesses or, on the basis of the pattern built up by means of the calculation algorithm, can produce in the engine component holes for the production of the inflow openings in the engine component.

Particularly the abovementioned first, second and third input parameters in the form of the minimum spacing, the cooling fluid mass flow and the length of extent of the inflow surface can all be specified, singly or in groups, by the user or automatically, e.g. using the dimensions of the inflow surface and/or the dimensions of the wall to be cooled and using an operating temperature range, in particular a target temperature range for the material, and/or of the material of the engine component. Further input parameters can be strength- and/or production-specific (and, in the latter case, therefore dependent on the production method, e.g. additive or by machining) and hence, in particular, dependent on a manufacturing method for the production of the inflow openings and of the cooling ducts. In particular, the input parameters can be dependent on one of several manufacturing methods for which reference data are stored, possibly in a memory of the computer system used to determine the pattern. Thus, for example, the minimum spacing k or at least the range of the values permitted for the latter by means of the calculation algorithm varies depending on whether the engine component is to be produced additively or not.

The proposed solution furthermore provides an engine component having a cooling duct arrangement, in which component at least a subregion of an inflow surface having a plurality of inflow openings for a plurality of cooling ducts of the cooling duct arrangement has a pattern in which

- the inflow openings are provided with a respective central point at vertices of identical virtual isosceles triangles which each have at least one vertex in common and in which the length of the bases of the triangles each correspond to a minimum spacing k,
- each inflow opening has an identical mean diameter a,
- a recess associated with a cooling duct in each case has a maximum width s and the following applies:
  1. a={0.2 mm; 2 mm};
  2. 2a≤k≤8a; and
  3. a≤s≤8a.

In one variant embodiment, a base angle in each case situated opposite the base of a triangle is in the range of from 50° to 100°, and the two identical leg angles are in the range of from 35° to 70°. Here, the sum of the base angle and the two identical leg angles always corresponds to 180°.

In principle, the proposed solution can be used with different engine components, e.g. especially with an engine component as part of a or in the form of a turbine blade.

In one variant embodiment, the engine component is a combustion chamber shingle for a combustion chamber of a gas turbine engine, in which a cooling film is to be produced, by means of the recesses provided on the inside, on an inner side of the combustion chamber shingle facing the combustion space of the combustion chamber. In particular, the wall to be cooled can have a heat insulation layer. The recesses of the cooling ducts can thus be provided, in particular, in a corresponding heat insulation layer.

The appended figures illustrate, by way of example, possible variant embodiments of the proposed solution.

IN THE FIGURES

Figure 7:
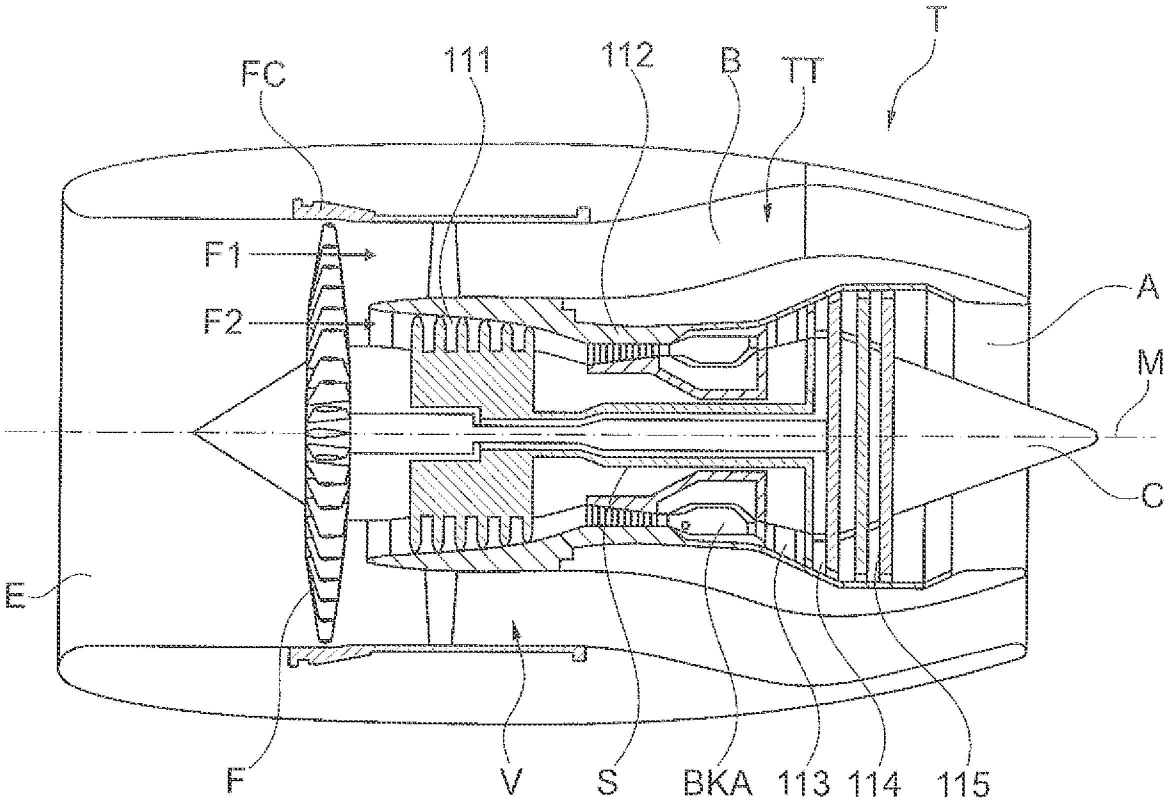
FIG. 7 shows, in a sectional view, an engine in which an engine component of FIG. 1 is used.

FIG. 7 illustrates, schematically and in a sectional illustration, an engine T in which the individual engine components are arranged one behind the other along an axis of rotation or central axis M, and the engine T is formed as a turbofan engine. At an inlet or intake E of the engine T, air is drawn in along an inlet direction by means of a fan F. This fan F, which is arranged in a fan casing FC, is driven by means of a rotor shaft S which is set in rotation by a turbine TT of the engine T. Here, the turbine TT adjoins a compressor V, which comprises for example a low-pressure compressor 111 and a high-pressure compressor 112, and possibly also a medium-pressure compressor. On the one hand, the fan F conducts air in a primary air flow F1 to the compressor V, and, on the other hand, to generate thrust, in a secondary air flow F2 to a secondary flow duct or bypass duct B. The bypass duct B here runs around a core engine comprising the compressor V and the turbine TT and comprising a primary flow duct for the air supplied to the core engine by the fan F.

The air conveyed into the primary flow duct by means of the compressor V passes into a combustion chamber portion BKA of the core engine, in which the drive energy for driving the turbine TT is generated. For this purpose, the turbine TT has a high-pressure turbine 113, a medium-pressure turbine 114 and a low-pressure turbine 115. Here, the energy released during the combustion is used by the turbine TT to drive the rotor shaft S and thus the fan F in order to generate the required thrust by means of the air conveyed into the bypass duct B. Both the air from the bypass duct B and the exhaust gases from the primary flow duct of the core engine flow out via an outlet A at the end of the engine T. In this arrangement, the outlet A generally has a thrust nozzle with a centrally arranged outlet cone C.

In principle, the fan F can also be coupled, via the rotor shaft S and an additional epicyclic planetary gear mechanism, to the low-pressure turbine 115 and can be driven by the latter. It is furthermore also possible to provide other, differently designed gas turbine engines in which the proposed solution can be used. For example, engines of this type may have an alternative number of compressors and/or turbines and/or an alternative number of rotor shafts. As an example, the engine may have a split-flow nozzle, meaning that the flow through the bypass duct B has its own nozzle, which is separate from and situated radially outside the core engine nozzle. However, this is not limiting, and any aspect of the present disclosure may also apply to engines in which the flow through the bypass duct B and the flow through the core are mixed or combined before (or upstream of) a single nozzle, which may be referred to as a mixed-flow nozzle. One or both nozzles (whether mixed or split flow) can have a fixed or variable area. While the example described relates to a turbofan engine, the proposed solution may be applied for example to any type of gas turbine engine, such as an open-rotor engine (in which the fan stage is not surrounded by an engine nacelle) or a turboprop engine.

Figure 8:
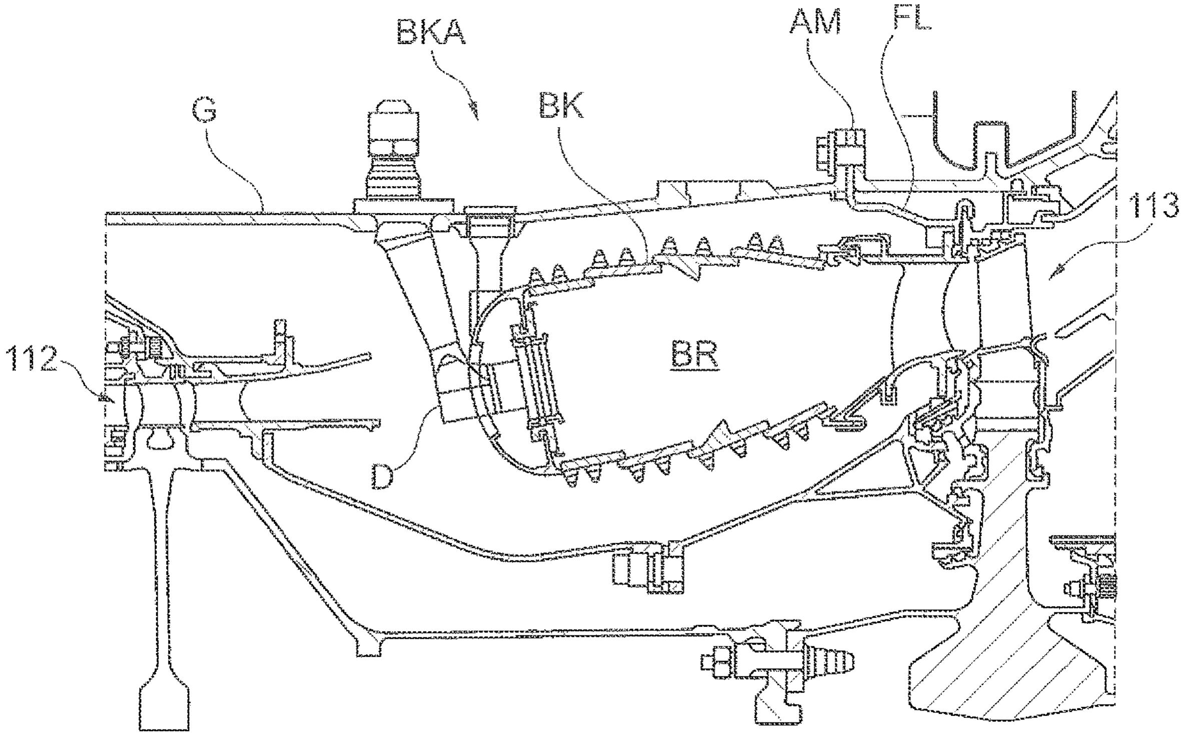
FIG. 8 shows, on an enlarged scale, a segment of a combustion chamber of the engine of FIG. 7 on which an engine component corresponding to FIG. 1 can be used.

FIG. 8 shows a longitudinal section through the combustion chamber portion BKA of the engine T. This shows in particular an (annular) combustion chamber BK of the engine T. A nozzle assembly is provided for the injection of fuel or an air-fuel mixture into a combustion space BR of the combustion chamber BK. Said nozzle assembly comprises a combustion chamber ring, on which multiple fuel nozzles D are arranged along a circular line around the central axis M. The nozzle outlet openings of the respective fuel nozzles D which lie inside the combustion chamber BK are here provided on the combustion chamber ring. Here, each fuel nozzle D comprises a flange by means of which a fuel nozzle D is screwed to an outer casing G of the combustion chamber portion BKA. Via an arm AM and a flange FL, an outer combustion chamber wall of the combustion chamber BK is also connected to this outer casing 22.

Combustion chamber walls of the combustion chamber BK may, depending on construction, be shielded from the combustion space BR with shingle components in the form of combustion chamber shingles. These combustion chamber shingles may, for example, be connected to inner and outer combustion chamber walls of the combustion chamber BK by means of fixing elements in the form of bolts and nuts. The combustion chamber walls normally have cooling holes and supply openings in the form of mixing air holes in order to be able to guide the air as a cooling fluid to the combustion chamber walls and the combustion chamber shingles. It is possible, in turn, for effusion cooling holes and/or cooling ducts to be provided in the combustion chamber shingles in order to produce a cooling film on a wall of the respective combustion chamber shingle facing the combustion space BR.

Figure 9:
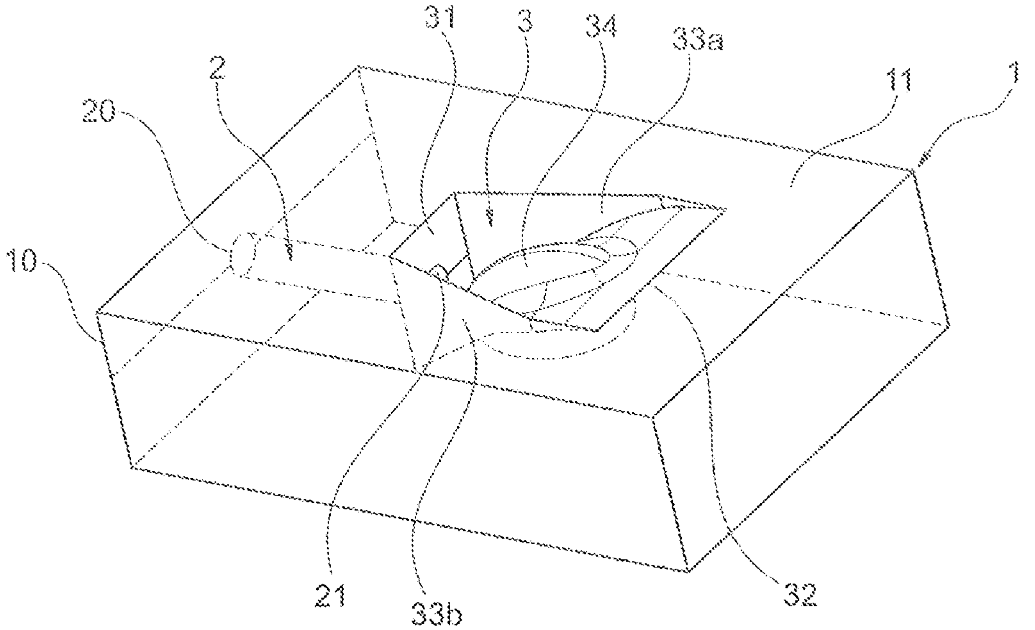
Prior Art Fig. 9
FIG. 9 shows an engine component known from the prior art having a cooling duct opening into a pocket-like recess.

FIG. 9 shows a solution known from the prior art in EP 3 101 231 A1 for the design of a combustion chamber shingle 1 with a cooling duct arrangement. Here, FIG. 9 shows a segment of the combustion chamber shingle 1 with a wall 11, which faces the combustion space BR in the correctly installed state of the combustion chamber shingle. Provided in the wall 11 is a plurality of recesses 3, via which a cooling fluid, here in the form of cooling air, is brought up to the wall 11 in order to produce on the wall 11 a cooling film which is as homogeneous as possible. Just one pocket-like recess 3 is illustrated by way of example in FIG. 9. Starting from an outflow opening 21 in an end face 31 of the recess 31, this pocket-like recess 3 guides cooling fluid in the direction of a transition 32 of the recess 3 and up to the surface of the wall 11. In this case, mutually opposite side walls 33*a* and 33*b*, each adjoining the end face 31, are arranged at an angle to a central axis of the recess 3, with the result that the recess 3 widens like a diffuser, starting from the end face 31. Provided approximately in the center in the case of the recess 3 illustrated in FIG. 9 is an impact element 34 which, by way of example, is configured as a segment of an ellipsoid of rotation or a spoon back.

The outflow opening 21 provided in the end face 31 of the recess 3 is part of a cooling duct 2 formed within the combustion chamber shingle 1. The cooling fluid flows into this cooling duct 2 via an inflow opening 20 in an inflow surface 10 of the combustion chamber shingle 1. Via the cooling duct 2, the cooling fluid is guided into the recess 3, and is then guided along the surface of the wall 11 via the recess.

FIGS. 1 to 5C illustrate how, for a cooling arrangement 200 with a plurality of cooling ducts 2, associated inflow openings 20*a*-20*b* or 20.1-20.5 can be arranged in the inflow surface 10, following a specific pattern, enabling the pattern to meet the specific requirements for the necessary cooling mass flow demand while, at the same time, also facilitating automated specification of the positions of the inflow openings in the inflow surface 10.

Figure 1:
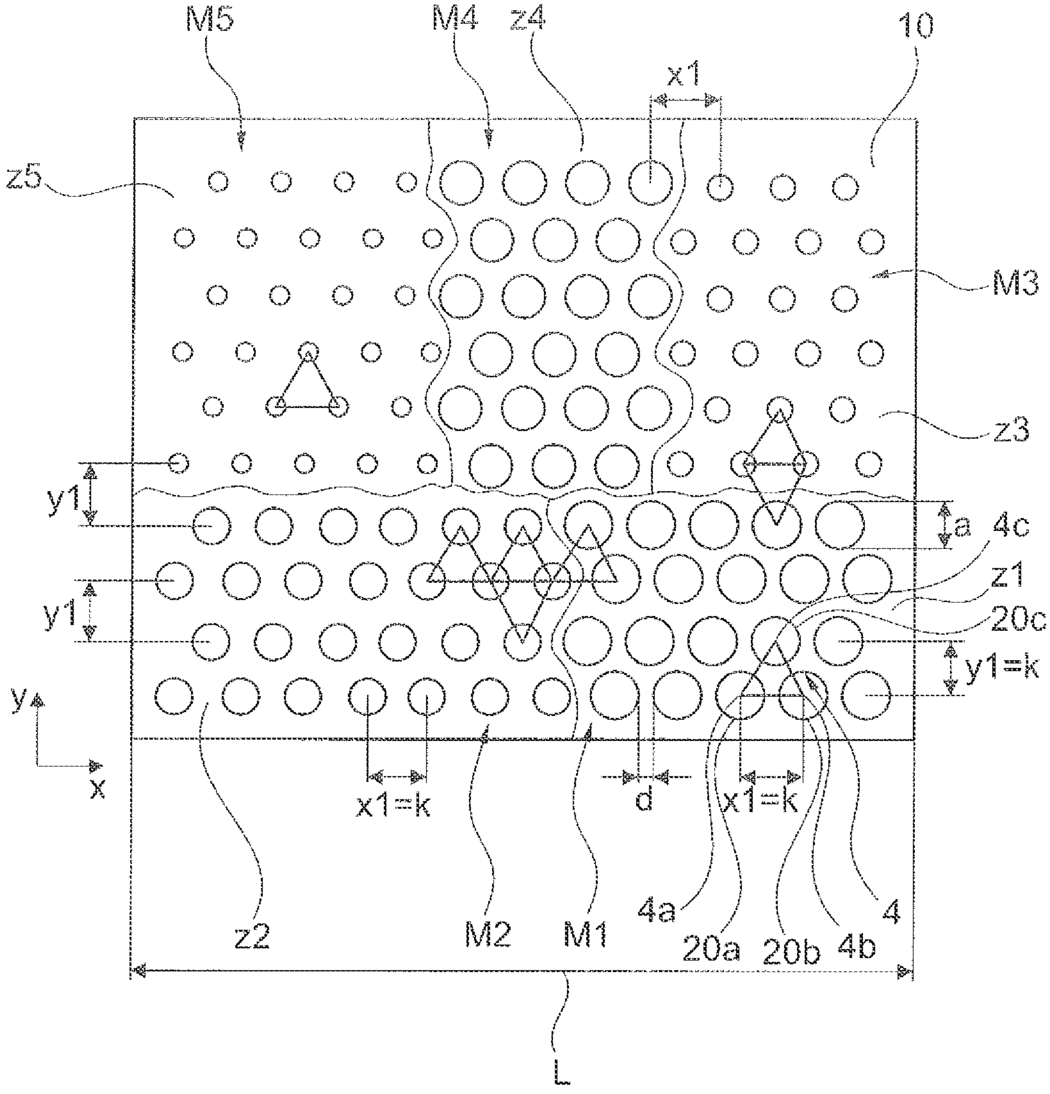
FIG. 1 shows, in a front view, a segment of an inflow surface of a proposed engine component in which, in accordance with one variant embodiment of a proposed method, inflow openings in a specified pattern having different regions that differ in respect of a requirement for cooling fluid are arranged.

Here, FIG. 1 shows, in a front view, the inflow surface 10 with a length of extent L along a first direction of extent x. Perpendicularly to the first direction of extent x, the inflow surface 10 extends along a second direction of extent y. The starting point for the production of a pattern having a plurality of pattern sections M1-M5 for the arrangement of a multiplicity of inflow openings 20*a* to 20*c* is the specification of a minimum spacing k between two inflow openings 20*a* and 20*b* adjacent to one another along the first direction of extent x, said spacing resulting, in particular, from a possible minimum wall thickness that is still allowed by the material for the combustion chamber shingle 1, for example. The material is, for example, an Ni- or Co-based alloy (e.g. C263, H286 or H230).

Furthermore, a maximum permissible mean diameter a for the inflow openings 20*a* or 20*b* is now assumed in order to determine how many inflow openings 20*a*, 20*b* with this mean diameter a are required to ensure a specified mass flow of cooling fluid via cooling ducts 2 to be provided over a partial length of the total length L while maintaining the specified minimum distance k. Here, by way of example, the number of equally distributed inflow openings 20*a*, 20*b* along the direction of extent x, which coincides, for example, with a circumferential direction, is obtained from the integer part of the quotient of the partial length of the length of extent L and the minimum spacing k in the case of the maximum permissible mean diameter a.

Depending on the necessary or specified mass flow of cooling fluid which is to be delivered via the inflow openings 20*a*, 20*b* to the associated recesses 3, the mean diameter a that has actually to be specified may then also prove to be smaller. The decisive factor is first of all to determine how many inflow openings 20a, 20b must be provided spaced apart from one another by the minimum spacing k along the direction of extent x on the specified partial length in order to be able to form the desired mass flow of cooling fluid, wherein the minimum spacing k corresponds to the spacing between the central points of the inflow openings 20a and 20b.

In this context, it is furthermore worth noting that the mean diameter a and a maximum width s of a recess 3 which characterizes the spacing between the two side walls 33a and 33b are in a close parameter relationship. The mean diameter a of the inflow openings 20a, 20b and the maximum width s at the recess 3, which widens in a funnel shape and in the manner of a diffuser, starting from an outflow opening 21, are consequently correlated with one another.

On the basis of the determined minimum spacing k along the direction of extent x, an isosceles triangle 4 is now defined, the base of which has the minimum spacing k as a length and also the minimum section k as a height h and at the vertices 4a, 4b and 4c of which in each case a central point of one of three inflow openings 20a, 20b and 20c, each with the mean diameter a, is provided. This isosceles triangle 4 forms the starting point for the further buildup of the pattern with its pattern sections M1-M5. In this case, a pattern section M1 is assigned to a first zone or to a first subregion z1 on the inflow surface 10 for which the necessary mass flow of cooling fluid may be different from mass flows which may have to be made available over other zones or subregions z2 to z5 of the inflow surface 10.

For the (first) subregion z1, the pattern in pattern section M1 with the inflow openings 20a, 20b and 20c is in all cases first built up using a plurality of isosceles triangles 4, each having at least one vertex 4a, 4b or 4c in common. Specification by means of the isosceles (reference) triangle 4 and parallel alignment of the bases of these isosceles triangles with respect to one another gives rise in direction of extent y to successive rows of inflow openings 20a, 20b, 20c which, based on direction of extent x, are each offset with respect to one another by half the minimum spacing k and are spaced apart equidistantly by the minimum spacing k. By means of the specification of the minimum spacing k, which depends, in particular, on the material and the strength values thereof and, where applicable, also on production-related criteria, it is ensured in pattern section M1 of the built-up pattern that there always remains a dividing wall of defined wall thickness d between the edges of the individual inflow openings 20a, 20b, 20c in the inflow surface 10, said wall having a sufficient stability. In principle, the following applies for the height h (or y1) as a function of the minimum spacing k: $0.1\ k \le h \le 4\ k$.

For other subregions z2 to z5 of the inflow surface 10, the pattern is modified accordingly, depending on the mass flow of cooling fluid required. In this case, however, the basic model and thus the structure of the pattern based on the isosceles triangle 4 is retained. The individual inflow openings 20a, 20b and 20c continue to be provided at the vertices of isosceles triangles 4 of identical design. Consequently, in the example illustrated in FIG. 1, only the mean diameters a are correspondingly adapted, in this case reduced, in order to meet a lower cooling fluid requirement.

However, the possibility that the minimum spacing k will have to be changed in other regions, e.g. on account of the shape of the combustion chamber shingle 1, is not excluded here. Here too, however, the basic structure is retained, and only the distribution of the inflow openings and of the cooling ducts 2 and recesses 3 adjoining said openings changes. In this case, the distribution can change, for example, along a defined path p, which is a function of the engine axis, of the radial spacing perpendicularly to this engine axis and an angle at the circumference. Here, the engine axis can be defined by a spatial direction running perpendicularly to the two directions of extent x and y, for example.

In the case of the pattern M1-M5 illustrated in FIG. 1, a homogeneous cooling film with five different regions, in each of which different cooling air quantities are required, is achieved, wherein the pattern M1-M5 is built up in an automated manner using isosceles triangles 4 on the basis of a small number of defined input parameters and thus boundary conditions, beginning with the zone or subregion z1 that has the most densely packed inflow openings 20a, 20b and 20c. The arrangement of the inflow openings 20a, 20b and 20c for the further subregions z2 to z5 is then generated while retaining the basic structure and hence spacings x1=k and y1=k along the two directions of extent x and y.

Figure 2:
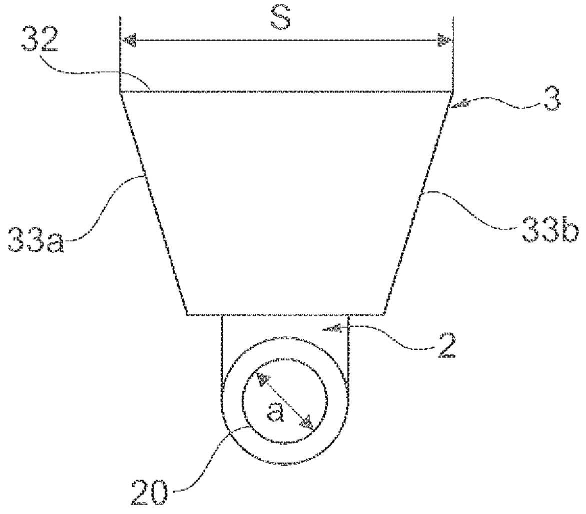
FIG. 2 shows, in plan view, a single cooling duct having an inflow opening and an associated recess into which the cooling duct opens.
Figure 3:
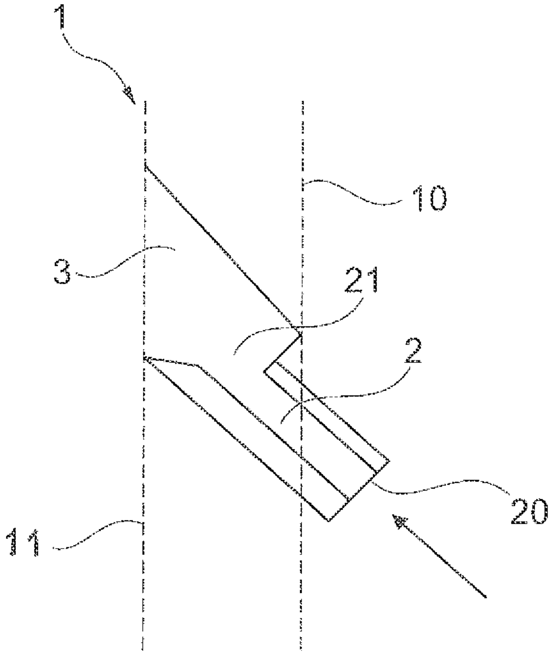
FIG. 3 shows a sectional illustration of the cooling duct having the recess corresponding to FIG. 2.
Figure 4:
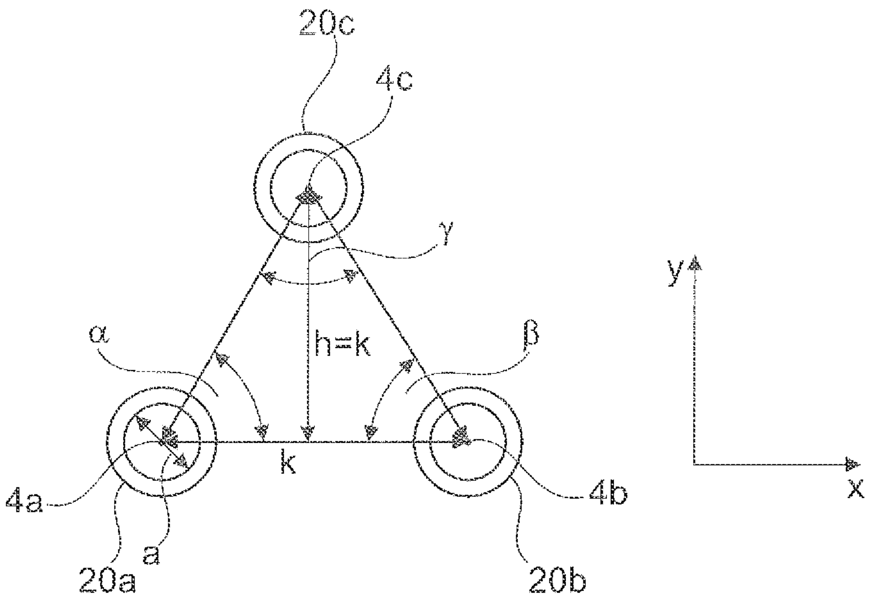
FIG. 4 shows, in isolation, a triangle from which the pattern of FIG. 1 is built up and which has inflow openings at its three vertices.

The different geometrical relationships between the input parameters and the decisive geometrical relationships are illustrated once again here with reference to FIGS. 2, 3 and 4. By way of example, a mean diameter a of 0.2 mm to 2 mm is specified here, and $2a \le k \le 8a$ applies to the minimum spacing k.

$a \le s \le 8a$ furthermore applies to the maximum width s of the recess 3 widening in the manner of a diffuser in the associated wall 11. According to FIG. 4, the angles of the specified isosceles triangle 4 are such that a base angle γ, which lies opposite a base of the isosceles triangle 4 is in the range of from 50° to 100°, while the leg angles α, β of the triangle 4 are each in the range of from 35° to 70°.

Figure 5A:
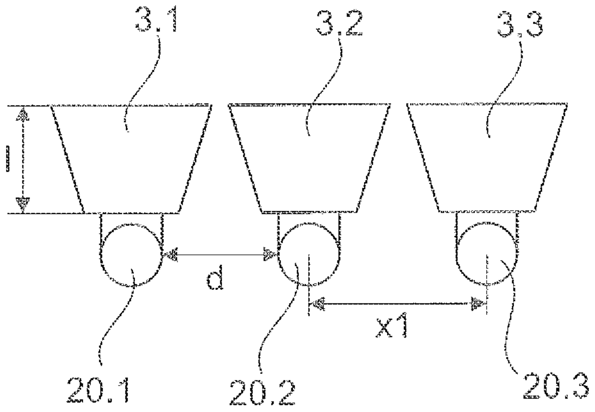
FIGS. 5A-5C show different variants for the implementation of the pattern of FIG. 3 and of the recesses adjoining the cooling ducts.
Figure 5B:
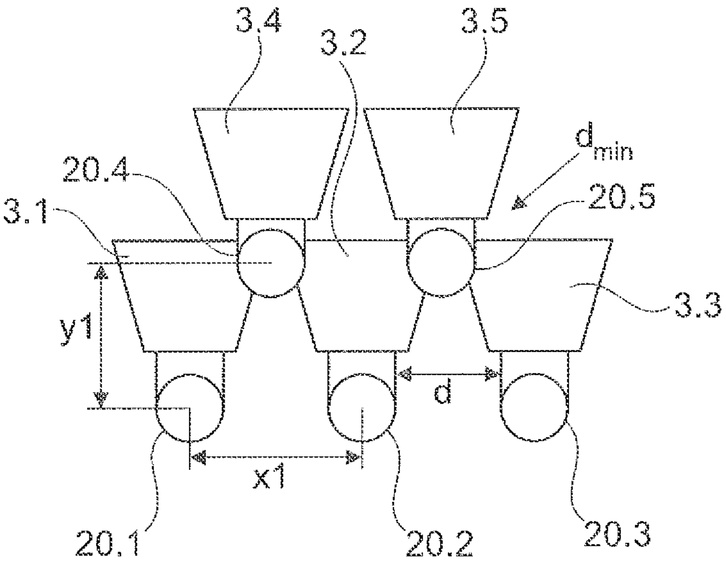

FIGS. 5A and 5B illustrate the arrangement along the longitudinal direction of extent x of adjacent inflow openings 20.1, 20.2, 2.3 with in this case respectively associated recesses 3.1, 3.2 and 3.3. Also illustrated in this context is a length I of the pocket-like recesses 3.1, 3.2 and 3.3 in the wall 11. It is thus possible, according to the variant embodiment in FIG. 5B, for the minimum spacing k and hence the resulting minimum wall thickness $d_{min}$ between the adjoining inflow openings 20.1/20.2 and 20.2/20.3 to be reduced to such an extent that a certain region of overlap is obtained between the mutually adjoining cooling ducts 2 and recesses 3.4, 3.5 of rows of inflow openings 20.4, 20.5 lying in the direction of extent y. However, by means of specification with the aid of the isosceles triangles 4, it is readily ensured, with the possibility of appropriate parametrization, that a minimum material thickness $d_{min}$ within the combustion chamber shingle 1 is not undershot.

Figure 5C:
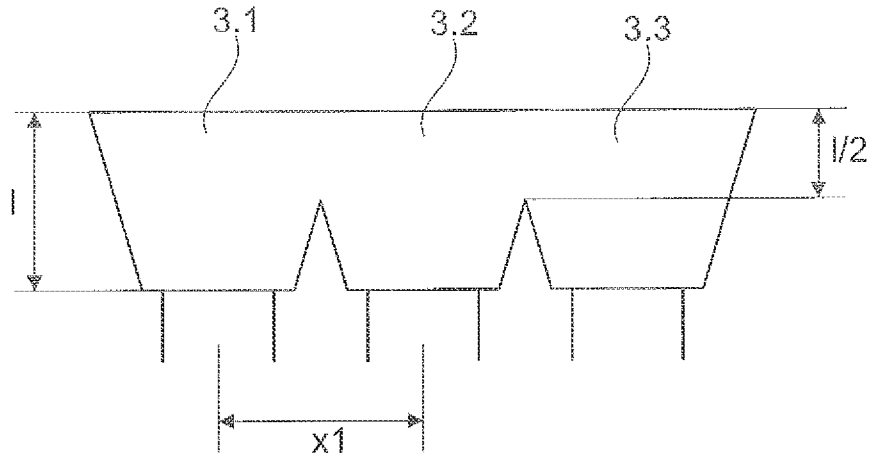

In accordance with FIG. 5C, it is likewise readily possible to provide for recesses 3.1, 3.2 and 3.3 adjacent to one another in the first direction of extent x and located in the surface of the wall 11 to merge into one another up to a length of l/2 in the second direction of extent y.

Figure 6:
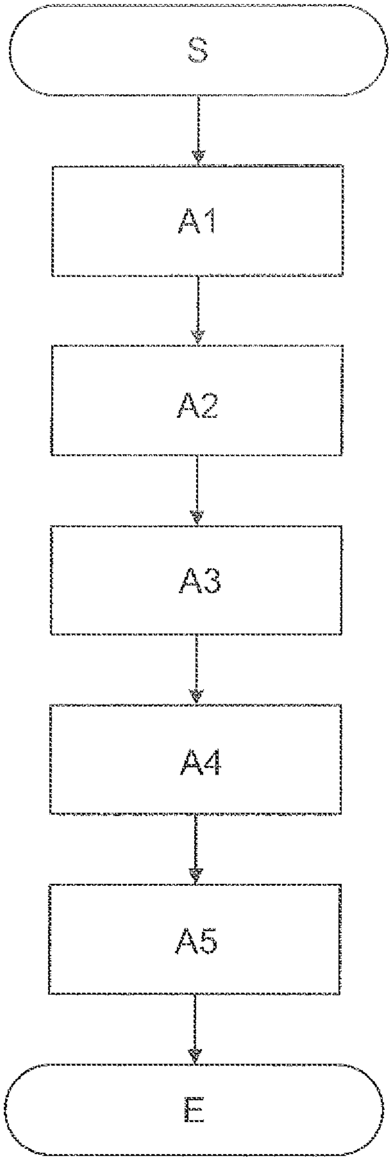
FIG. 6 shows a flow diagram for the progress of one variant embodiment of a proposed method.

The flow diagram in FIG. 6 illustrates once again the progress of a production method already explained above, by means of which a cooling duct arrangement 200 with inflow openings 20a-20c; 20.1-20.5 can be built up efficiently, following a defined pattern, and, in particular, can in this process be generated in a computer-assisted manner for manufacture, and is adaptable in a variable way.

After the start of a program sequence at a time S, a minimum spacing k that must exist between two adjacent inflow openings 20a, 20b is first of all specified in a method step A1 by the user or automatically by the computer system on the basis of stored material and/or manufacturing data.

On the basis of a specified mass flow for the cooling fluid through the individual cooling ducts 2 that is necessary for the cooling of the wall 11 in a certain region, and on the basis of a length of extent of the inflow surface 10 along the first direction of extent x, which corresponds, for example, to part or all of the total length of extent L, the number of cooling ducts 2 and the mean diameter a thereof that must be provided along this direction of extent x is then determined in a method step A2.

In a subsequent method step A3, a (first) isosceles (reference) triangle 4, at the vertices 4*a*, 4*b* and 4*c* of which in each case a central point of one of three inflow openings 20*a*, 20*b* and 20*c* with the mean diameter a is to be provided, is then defined. Here, the length of a base of the isosceles triangle 4, said base extending along the first direction of extent x, corresponds to the specified minimum standard k. In this case, the minimum spacing k also takes account of the fact that the maximum width s of a recess 3 respectively assigned to a cooling duct 2 is in a specific parameter relationship with the mean diameter a of its inflow opening 20*a*-20*c*. Accordingly, the maximum width s is determined in a method step A4, e.g. with the proviso that s=a . . . 8a applies. A specific pattern for the recesses 3 in the wall 11 to be cooled is thereby also specified in addition to the pattern for the inflow openings 20*a*, 20*b*, 20*c* in the inflow surface 10.

Finally, the pattern comprising all the pattern sections M1-M5 for the individual inflow openings 20*a*, 20*b*, 20*c* over the total specified inflow surface 10 is then built up in a method step A5 by means of a calculation algorithm that is run, taking into account the existing boundary conditions, optionally while taking into account the different cooling requirement for the individual subregions z1 to z5. Here, as explained, the pattern comprising the pattern sections M1-M5 is built up along the two directions of extent x and y by means of a multiplicity of isosceles triangles 4, which are identical and hence correspond to the first reference triangle. For the definition of the pattern M1-M5, the triangles 4 each have at least one vertex 4*a*, 4*b* or 4*c* in common. Starting from the (reference) subregion z1 with the most densely packed inflow openings 20*a*, 20*b* and 20*c*, using the basic model based on the use of isosceles triangles for example, the spacing of the inflow openings 20*a*, 20*b* and 20*c* with respect to one another in the other subregions z2-z5 is not changed, but the mean diameter a for the inflow openings 20*a*, 20*b* and 20*c* can vary depending on the respective subregion z2-z5.

After the end E of the program sequence, a computer-generated pattern for the arrangement of the inflow openings 20*a*, 20*b*, 20*c* and, by means of the latter, then also of the cooling ducts 2 and of the associated recesses 3 is thus available on the basis of a few boundary conditions to be specified. By means of a cooling fluid flowing in via such a pattern, it is possible to provide an efficient and homogeneous cooling film on the wall 11. Here, the procedure outlined above ensures that a cooling film of this kind can also be generated efficiently on engine components of different configurations and, in particular, without the need to specify entirely new modeling parameters for the arrangement of the cooling ducts 2 and of the inflow openings 20*a*-20*c*, 20.1-20.5.

LIST OF REFERENCE SIGNS

1 Combustion chamber shingle (engine component)
10 Inflow surface
11 Wall
111 Low-pressure compressor
112 High-pressure compressor
113 High-pressure turbine
114 Medium-pressure turbine
115 Low-pressure turbine
2 Cooling duct
20, 20.1-20.5 Inflow opening
20*a*, 20*b*, 20*c*
200 Cooling duct arrangement
21 Outflow opening
3, 3.1-3.5 Recess
31 End face
32 Transition
33*a*, 33*b* Side wall
34 Impact element
4 Triangle
4*a*, 4*b*, 4*c* Vertex
a (Mean) diameter
A Outlet
AM Arm
B Bypass duct
BK Combustion chamber
BKA Combustion chamber portion
BR Combustion space
C Outlet cone
D Fuel nozzle
d, $d_{min}$ Material thickness
E Inlet/Intake
F Fan
F1, F2 Fluid flow
FC Fan casing
FL Flange
G Outer casing
h Height
k Minimum spacing
L Length of extent
l Length
M Central axis/axis of rotation
M1-M5 Pattern regions
S Rotor shaft
T (Turbofan) engine
TT Turbine
V Compressor
z1-z5 Subregion/zone

The invention claimed is:

1. A method for producing an engine component having a cooling duct arrangement, the method comprising:

providing a plurality of cooling ducts and a plurality of inflow openings, with each of the plurality of cooling ducts having one of the plurality of inflow openings, wherein the plurality of inflow openings are arranged according to a pattern on an inflow surface of the engine component, each of the plurality of cooling ducts flowing into a respective recess in a wall of the engine component, the plurality of cooling ducts configured to guide a cooling fluid onto the wall to form a cooling film along the wall, wherein the method further comprises determining the pattern for the plurality of inflow openings comprises the following steps:

specifying a minimum spacing between two adjacent ones of the plurality of inflow openings, determining a quantity of the plurality of cooling ducts and a mean diameter for each of the plurality of inflow openings based on a specified mass flow for the cooling fluid through the plurality of cooling ducts and on a length of extent of the inflow surface along a first direction of extent of the inflow surface, defining an isosceles triangle having three vertices with one of the plurality of inflow openings positioned centrally at each of the three vertices, wherein a length of a base of the isosceles triangle corresponds to a specified minimum spacing, the base extending along the first direction of extent, determining a maximum width of each recess, each recess being assigned to one of the plurality of cooling ducts, on a basis of the mean diameter, and building up the pattern in a first region of the inflow surface using a plurality of the isosceles triangles, wherein a row of the plurality of isosceles triangles situated one behind the other along the first direction of extent defines a number of vertices, wherein two adjacent ones of the plurality of isosceles triangles each have at least one of the vertices in common and at the vertices having a respective one of the plurality of inflow openings with the mean diameter, each of the plurality of inflow openings at the vertices leading to one of the plurality of cooling ducts leads into one of the recesses with the maximum width.

2. The method as claimed in claim 1, wherein a height of the isosceles triangle and hence a spacing between a tip of the isosceles triangle and the base is dependent on the specified minimum spacing.

3. The method as claimed in claim 1, wherein the bases of the plurality of isosceles triangles for the pattern extend parallel to one another.

4. The method as claimed in claim 1, wherein the pattern is based on the plurality of isosceles triangles having common vertices extending along the first direction of extent and along a second direction of extent extending perpendicularly thereto.

5. The method as claimed in claim 1, wherein the minimum spacing and the mean diameter are specified as proportional to one another.

6. The method as claimed in claim 4, wherein, in a second region of the inflow surface, the pattern for the plurality of inflow openings is continued on the basis of the plurality of isosceles triangles having common vertices, but the mean diameter for the plurality of inflow openings of the first region being different from a mean diameter for the plurality of inflow openings of the second region.

7. The method as claimed in claim 1, wherein, in a third region of the inflow surface, the pattern for the plurality of inflow openings is continued on the basis of the plurality of isosceles triangles having common vertices, but a minimum spacing in the third region is different than in the first region.

8. The method as claimed in claim 6, wherein a quantity of the plurality of inflow openings for the second region is reduced along the second direction of extent by increasing the minimum spacing or height of the plurality of isosceles triangles.

9. The method as claimed in claim 1, wherein the mean diameter is in a range of 0.2 mm to 2 mm.

10. The method as claimed in claim 1, wherein the following applies for the minimum spacing:

$$2a \le k \le 8a$$

where a is the mean diameter and k is the minimum spacing.

11. The method as claimed in claim 1, wherein the following applies for the minimum spacing:

$$k = i * a, \text{ where wherein } i = \{2,3,4,5,6,7,8\}$$

where a is the mean diameter and k is the minimum spacing.

12. The method as claimed in claim 1, wherein the following applies for the maximum width of the recess:

$$a \le s \le 8a$$

where a is the mean diameter and s is the maximum width.

13. The method as claimed in claim 1, wherein the following applies for the maximum width of the recess:

$$s = j * a, \text{ where } j = \{1,2,3,4,5,6,7,8\}$$

where a is the mean diameter and s is the maximum width.

14. The method as claimed in claim 1, wherein the minimum spacing is based on a material off which the engine component is produced.

* * * * *